US012754071B2

(12) United States Patent
Miller et al.

(10) Patent No.: US 12,754,071 B2
(45) Date of Patent: Oct. 6, 2026

(54) TIME-DELAY GATING FOR HIGH-PERFORMANCE OPERATION OF SUPERCONDUCTING DETECTORS

(71) Applicant: Quantum Opus, LLC, Plymouth, MI (US)

(72) Inventors: Aaron J. Miller, Novi, MI (US); Timothy Rambo, Livonia, MI (US); Hudson Jones, Novi, MI (US); Leo Oshiro, Novi, MI (US)

(73) Assignee: Quantum Opus, LLC, Plymouth, MI (US)

( * ) Notice: Subject to any disclaimer, the term of this patent is extended or adjusted under 35 U.S.C. 154(b) by 79 days.

(21) Appl. No.: 19/038,956

(22) Filed: Jan. 28, 2025

(65) Prior Publication Data

US 2025/0244168 A1 Jul. 31, 2025

Related U.S. Application Data

(60) Provisional application No. 63/626,256, filed on Jan. 29, 2024.

(51) Int. Cl.
*G01J 1/44* (2006.01)

(52) U.S. Cl.
CPC ........... *G01J 1/44* (2013.01); *G01J 2001/442* (2013.01)

(58) Field of Classification Search
CPC .............................. G01J 1/44; G01J 2001/442
See application file for complete search history.

(56) References Cited

U.S. PATENT DOCUMENTS

| | | | | |
|---|---|---|---|---|
| 10,158,038 | B1 * | 12/2018 | Do Valle | A61B 5/0002 |
| 2013/0143744 | A1 | 6/2013 | Marsili et al. | |
| 2013/0187051 | A1 | 7/2013 | McCaughan et al. | |
| 2017/0205284 | A1 | 7/2017 | De Geronimo | |
| 2022/0069152 | A1 | 3/2022 | Tosi et al. | |
| 2022/0170784 | A1 * | 6/2022 | Antolovic | G01J 1/4228 |

OTHER PUBLICATIONS

International Search Report and Written Opinion for an International Application No. PCT/US2025/013332, dated Jan. 27, 2026.

* cited by examiner

*Primary Examiner* — Jennifer D Bennett
(74) *Attorney, Agent, or Firm* — Nayyer J. Siddiqi; Quinn IP Law

(57) ABSTRACT

A detection system includes a superconducting detector having a plurality of nanowire sensors configured to operate simultaneously. The nanowire sensors are adapted to transmit respective signals upon detection of one or more photons. A controller is adapted to receive the respective signals transmitted by the plurality of nanowire sensors. The controller is adapted to designate an initial signal as indicating a real event, the initial signal being above a predefined amplitude. The controller is adapted to implement a crosstalk rejection sequence, including accepting the respective signals received within a threshold time after the real event during an acceptance window, via a gating unit, and rejecting the respective signals after the threshold time for a specified rejection window, via the gating unit. The crosstalk rejection sequence is repeated for subsequent designations of real events to achieve a desired rate of event rejection.

20 Claims, 6 Drawing Sheets

TIME-DELAY GATING FOR HIGH-PERFORMANCE OPERATION OF SUPERCONDUCTING DETECTORS

CROSS REFERENCE TO RELATED APPLICATIONS

The present application claims the benefit of priority to U.S. Provisional Application No. 63/626,256, filed Jan. 29, 2024, which is hereby incorporated by reference in its entirety.

INTRODUCTION

The present disclosure relates generally to a detection system having a superconducting detector with a plurality of nanowire sensors, and a method of controlling operation of the detection system. Superconducting detectors, such as superconducting nanowire single-photon detectors, function by detecting changes in the resistance of a superconducting material when a photon is absorbed. These detectors are employed in various fields, such as quantum computing, optical quantum technologies, astronomy and medical imaging. Many superconducting detectors suffer from the interference of crosstalk in maintain signal integrity. Additionally, it is challenging to ensure that the balance between thermal and electrical time constants and the electrical jitter noise of the superconducting detector is engineered sufficiently to enable high-quality pulse filtering.

Figure 1:
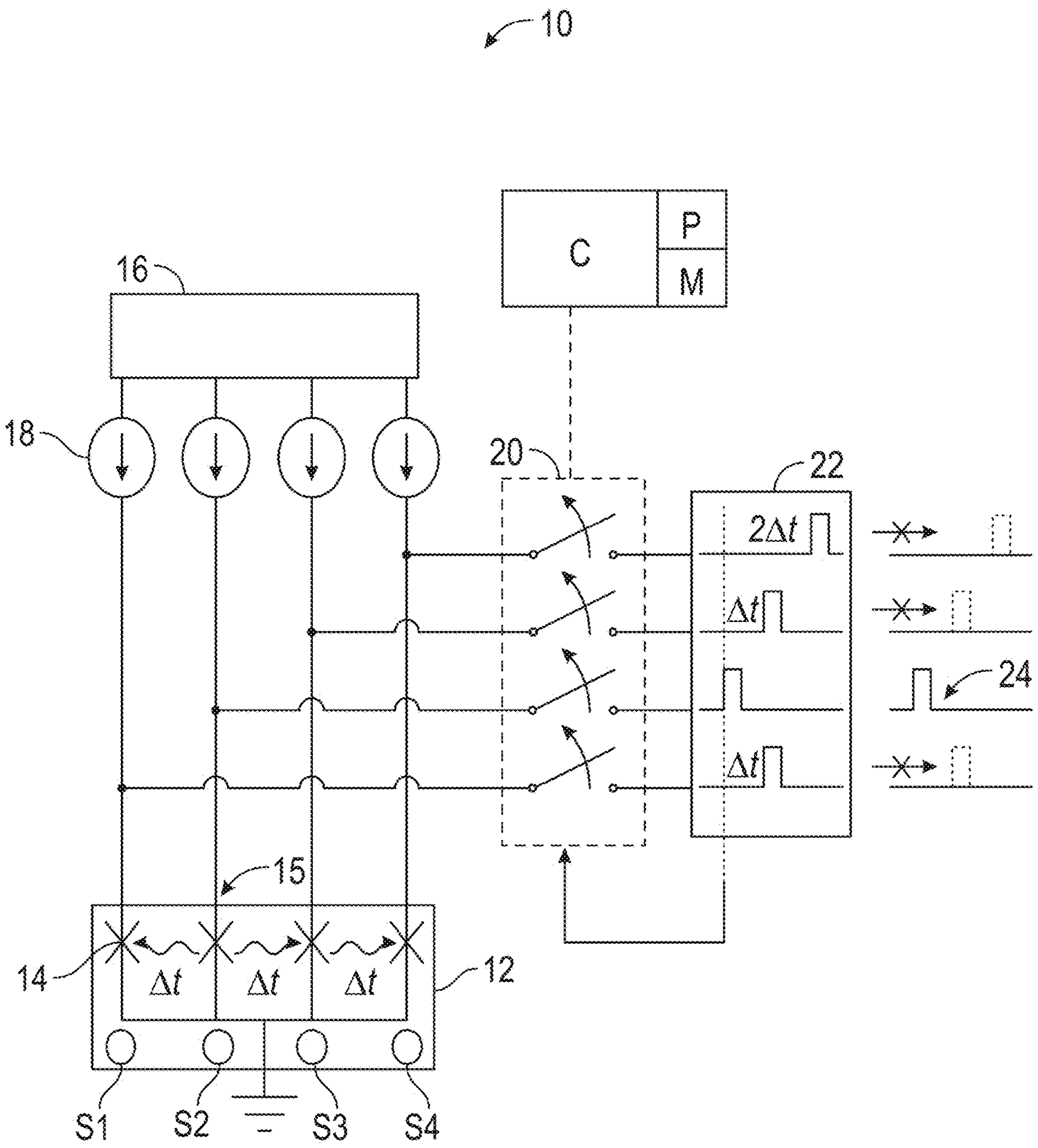
FIG. 1 is a schematic diagram of an example detection system having a superconducting detector and a gating unit.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers correspond to like or similar components throughout the several figures, FIG. 1 schematically illustrates a detection system 10 having a superconducting detector 12 with a plurality of nanowire sensors 14. The plurality of nanowire sensors 14 ("plurality of" omitted henceforth) each include a respective nanowire element adapted to transmit respective signals upon detection of one or more photons. The nanowire sensors 14 are configured to operate simultaneously and may be triggered to produce electrical outputs by either "real" inputs or "spurious" inputs. The spurious signals may be generated though crosstalk, which may originate from different sources.

Crosstalk manifests itself as unwanted signal coupling between adjacent channels or transmission paths. Sources of crosstalk include thermal scattering, electrical scattering, optical scattering and physical/mechanical vibration. With electrical crosstalk, when a signal transitions on a line in high-speed digital circuits, it may induce voltage and current fluctuations on neighboring lines through various coupling mechanisms, resulting in spurious signals. The coupling mechanisms may include capacitive coupling (where changing electric fields between conductors induce charge transfer) and inductive coupling (where changing current creates magnetic fields that induce voltages in adjacent conductors). Thermal crosstalk occurs when heat from one component affects the electrical characteristics of neighboring components. In optical systems, photonic crosstalk presents challenges. For example, in fiber optic communications or integrated photonic circuits, light may scatter between waveguides or reflect off interfaces, creating interference in adjacent channels.

The system 10 enables time-delay gating for high-performance operation of the superconducting detector 12. Referring to FIG. 1, the superconducting detector 12 operates through application of a respective bias current (indicated by arrow 18) slightly below a threshold switching current. The bias current 18 (which may be an alternating current or direct current) to each nanowire sensor 14 may be supplied through the respective ports of an electrical unit 16. Upon absorption of a photon, the nanowire sensor 14 switches from a low-resistance superconducting state to a high-resistance non-superconducting state, resulting in a rapid increase in output voltage.

Referring to FIG. 1, the superconducting detector 12 is in communication with a controller C having at least one processor P and at least one memory M (or non-transitory, tangible computer readable storage medium) on which instructions are recorded. The memory M can store executable instruction sets, and the processor P can execute the instruction sets stored in the memory M.

The controller C is adapted to receive the respective signals transmitted by the nanowire sensors 14. The controller C is adapted to designate an initial signal 24 as indicating a real event. The initial signal 24 may be above or below a predefined amplitude. As described below, the controller C is adapted to implement a crosstalk rejection sequence, including accepting the respective signals received within a threshold time after the real event during an acceptance window and rejecting the respective signals after the threshold time for a specified rejection window. The crosstalk rejection sequence is repeated for subsequent designations of real events to achieve a desired rate of event rejection.

Figure 2:
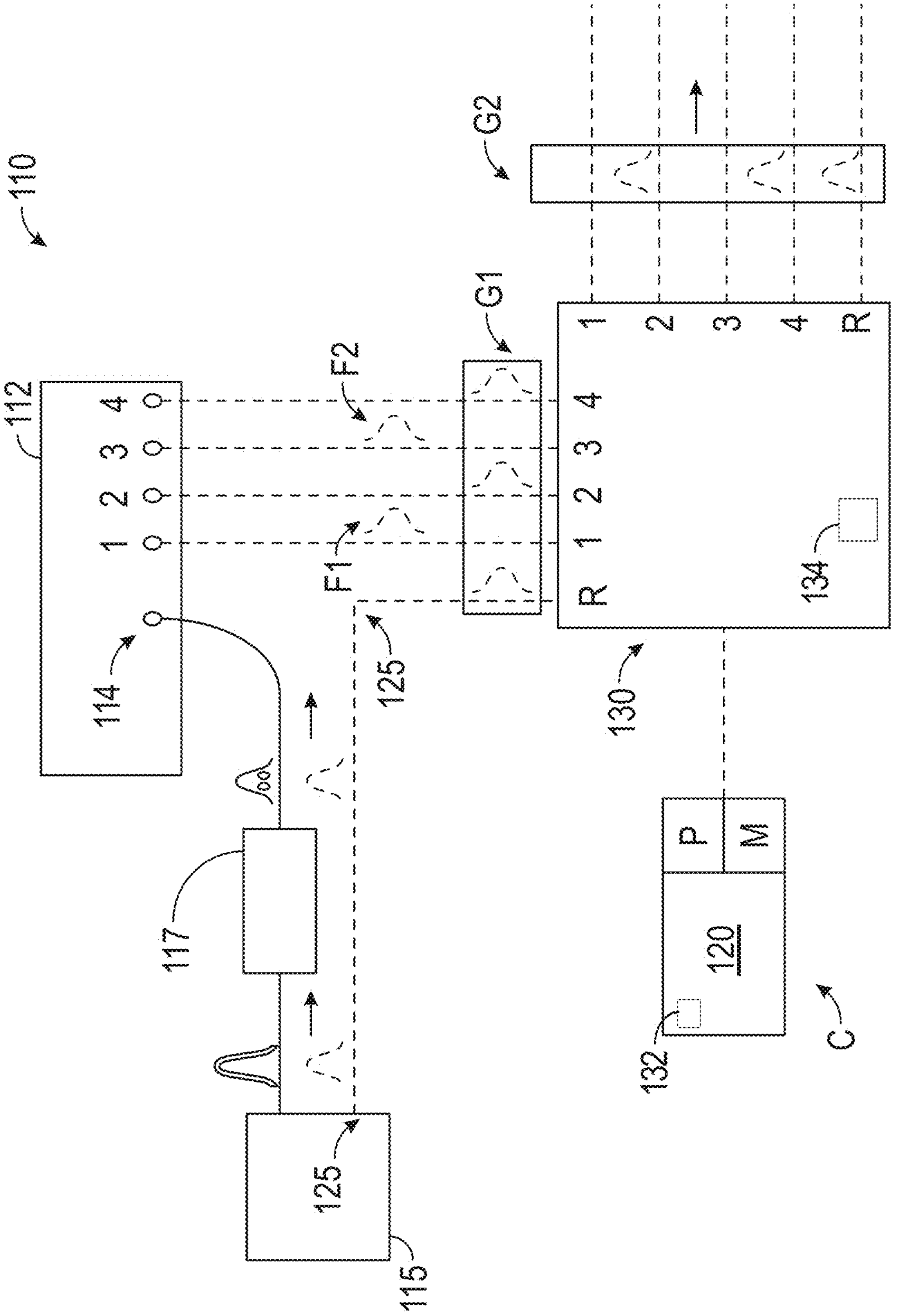
FIG. 2 is a schematic diagram of another example detection system having a superconducting detector and a gating unit.

Another example detection system 110 is shown in FIG. 2. While the embodiments shown in FIGS. 1-2 illustrate four nanowire sensors, it is understood that the number of nanowire sensors may be varied based on the application at hand. In one example, the nanowire sensors 14 are optimized for a wavelength in the mid-infrared sensitivity, for example at 3 micrometer wavelength.

Referring to FIG. 1, a gating unit 20 is adapted to selectively block the respective signals 22 beyond a threshold time after the initial signal 24. The threshold time may be based on the predefined time delay (Δt) between the respective signals indicating the real event and a false trigger or spurious event. The respective signals 22 transmitted by the superconducting detector 12 may be identified as "real" or "spurious" by their time-of-arrival characteristics. It is understood that the system 10 may include other electronic circuits and/or other elements not shown. For example, pulses from the superconducting detector 12 may be fed into a pulse thresholding discriminator (to transform them into digital form), then into logic circuitry (e.g., CPLD, FPGA, cryogenic logic (SFQ) etc.). The signal may be an analog signal, and the circuitry may include a constant fraction discriminator.

The gating unit 20 may employ various techniques and/or devices to perform the filtering or time-delay gating. For example, the gating unit 20 may include a plurality of switches adapted to selectively block the respective signals 22 from the nanowire sensors 14.

In the embodiment shown in FIG. 1, the initial signal 24 is caused by a "real" input 15 at sensor S2. The real inputs produce signals before spurious inputs. In this example, the signal output from sensor S2 is received first. Referring to FIG. 1, sensor S3 trigger next after a time delay (Δt). The nanowire sensors 14 that are equidistant from the real input 15 experience the trigger at the same time. Sensor S1 and sensor S3 are equidistant from sensor S2, as shown in FIG. 1. Sensor S4 triggers at a time (Δt) after its neighbor sensor S3 triggers, thereby producing a signal that is (2Δt) after the initial signal 24 (from a real event).

The initial signal 24 is used to gate or filter away the spurious signals, thereby ensuring clear output signals. The predefined time delay (Δt) is a function of the intrinsic thermal properties of the nanowire sensors 14, the spacing between the sensors and the inverse square law (governing heat propagation). In one example, the predefined time delay (Δt) is 600 picoseconds. In one embodiment, the spacing between adjacent pairs of the nanowire sensors 14 is about 50-150 nanometers.

The threshold time may be selected or tuned to maximize acceptance of the real events and maximize rejection of spurious events. The exact value of the threshold time will vary based on the application at hand. The nanowire sensors 14 each have a respective dead time. Dead time in a detector refers to the minimum recovery time following the detection of an event during which the nanowire sensors 14 are unable to detect or register another event. The controller C may be adapted to set the threshold time to be less than a shortest value of the respective dead time. In one embodiment, the nanowire sensors 14 each have respective dead times within about 10% of each other and the controller C is adapted to set the threshold time to be less than an average value of the respective dead time. The system 10 may be configured such that the predefined time delay (Δt) is less than the dead time, and the predefined time delay (Δt) is greater than an error in measuring a time of the respective signal indicating the real event.

FIG. 2 is a schematic diagram of another example detection system 110 having a superconducting detector 112 having a plurality of nanowire sensors. Referring to FIG. 2, a pulsed photon source 115 emits a beam that encounters a variable optical attenuator 117 that reduces the photons in the beam. The reduced beam is incident on the superconducting detector 112, for example via optical input switch 114. Each of the nanowire sensors in the superconducting detector 112 is adapted to detect a single photon and output an electric pulse in response. The superconducting detector 112 may be connected to a cryogenic vacuum system (not shown).

Referring to FIG. 2, the respective signals from the superconducting detector 112 (via radio-frequency output switches) are transmitted to a signal processing unit 130. The system 110 includes a controller C adapted to designate an initial signal as indicating a real event, the initial signal being above a predefined amplitude. The respective signals received by the controller C within a specified rejection window after the initial signal are filtered out, via a gating unit 120.

In the embodiment shown in FIG. 2, the gating unit 120 is a module (or timer or algorithm) selectively executable by the controller C, which has at least one processor P and at least one memory M (or non-transitory, tangible computer readable storage medium) on which instructions are recorded. The gating circuitry may be local to the sensor, utilized with local active electronics, such as transistors. In some embodiments, the gating unit 120 includes at least one transistor 132 for selectively blocking the respective signals from the plurality of nanowire sensors. The transistor 132 modulates electrical signals and may function as a switch or amplifier.

Here, the real events are captured by the nanowire sensors as indicated by lines 2 and 4, while spurious events are captured by the nanowire sensors as indicated by lines 1 and 3. Referring to FIG. 2, the false counts are indicated by signals F1, F2. The genuine count are indicated by signals G1, G2 at the input and output, respectively, of the signal processing unit 130. The pulsed photon source 115 may be adapted to emit a reference signal 125 for validation of the real signal, which is processed at junction R of the signal processing unit 130.

The acceptance window and the specified rejection window (between window start 205 and window end 215 in FIG. 3) may be implemented directly in real time. The acceptance window and the specified rejection window may be implemented during post-processing of the respective signals such as in the superconductor detector design, cryogenic electronics, room-temperature electronics, programmable logic, or computerized data acquisition (e.g., in a time-to-digital converter 134 shown in FIG. 2) or during post-processing of the respective signals. In this non-limiting example, the time-to-digital converter 134 adapted to measure a time interval between two of the respective signals.

Figure 3:
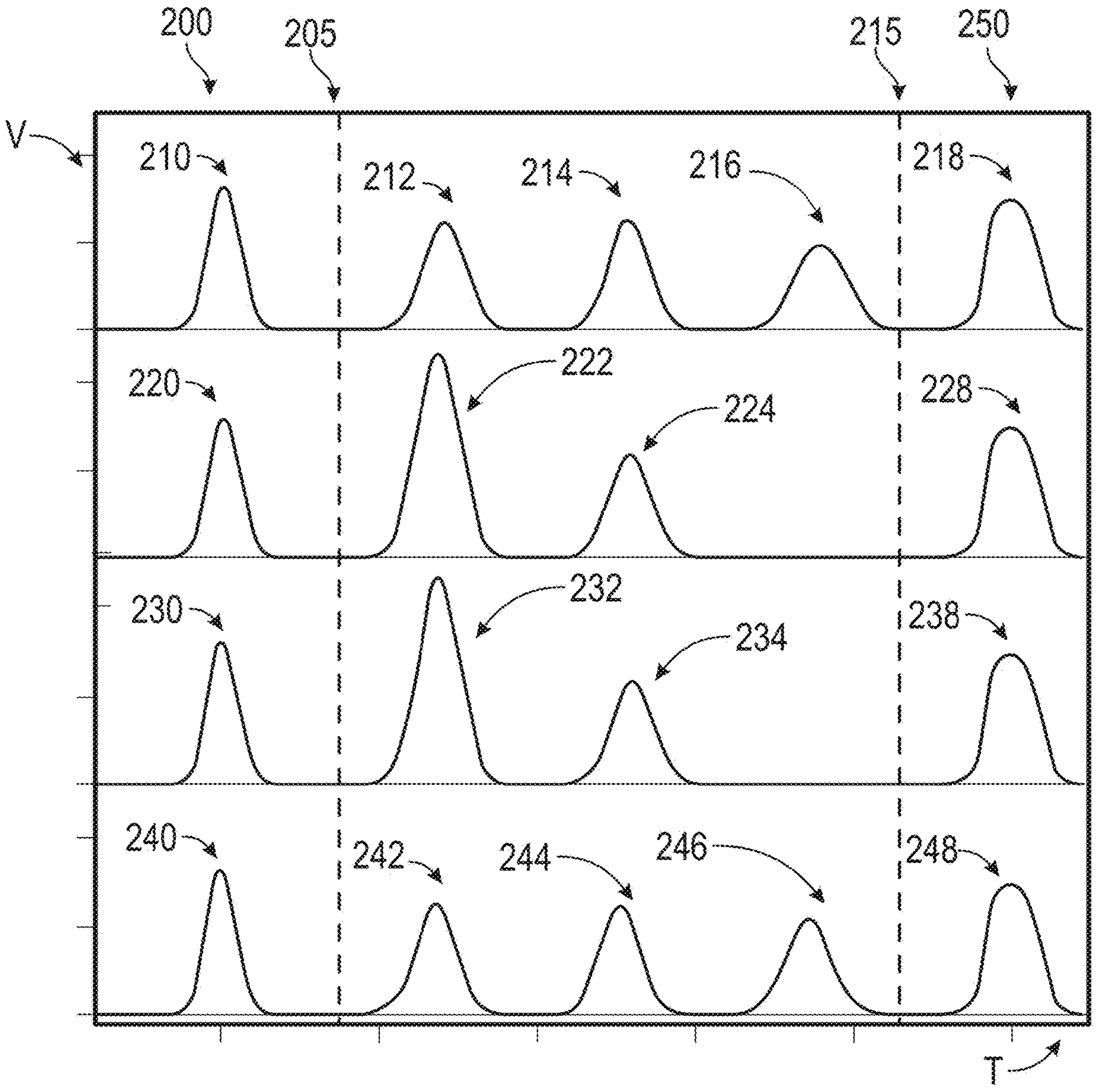
FIG. 3 illustrates the measured histograms of signals transmitted by a superconducting detector prior to being processed by a gating unit.

Referring now to FIG. 3, the measured histograms of signals transmitted by the superconducting detector 112 without application of the gating unit 120 are shown. The horizontal axis T in FIG. 3 denotes measured arrival time (e.g., in picoseconds) while the vertical axis V denotes signal amplitude or counts per unit time. The four graphs in FIG. 3 illustrate the raw detector output captured by the four nanowire sensors in the superconducting detector 112. The signals 210, 220, 230, 240 indicate a first set of real events 200 detected by the four nanowire sensors respectively (e.g., sensor S1, sensor S2, sensor S3, sensor S4 in FIG. 1).

Referring to FIG. 3, the signals 212, 214, 216 indicate false triggers or spurious events detected by sensor S1. Signals 222, 224 indicate false triggers detected by sensor S2. Signals 232, 234 indicate false triggers detected by sensor 3. Signals 242, 244, 246 indicate false triggers detected by sensor S4. Referring to FIG. 3, the signals 218, 228, 238, 248 indicate a second set of real events 250 detected by the four nanowire sensors respectively. The specified rejection window is between window start 205 and window end 215, shown in FIG. 3.

Figure 4:
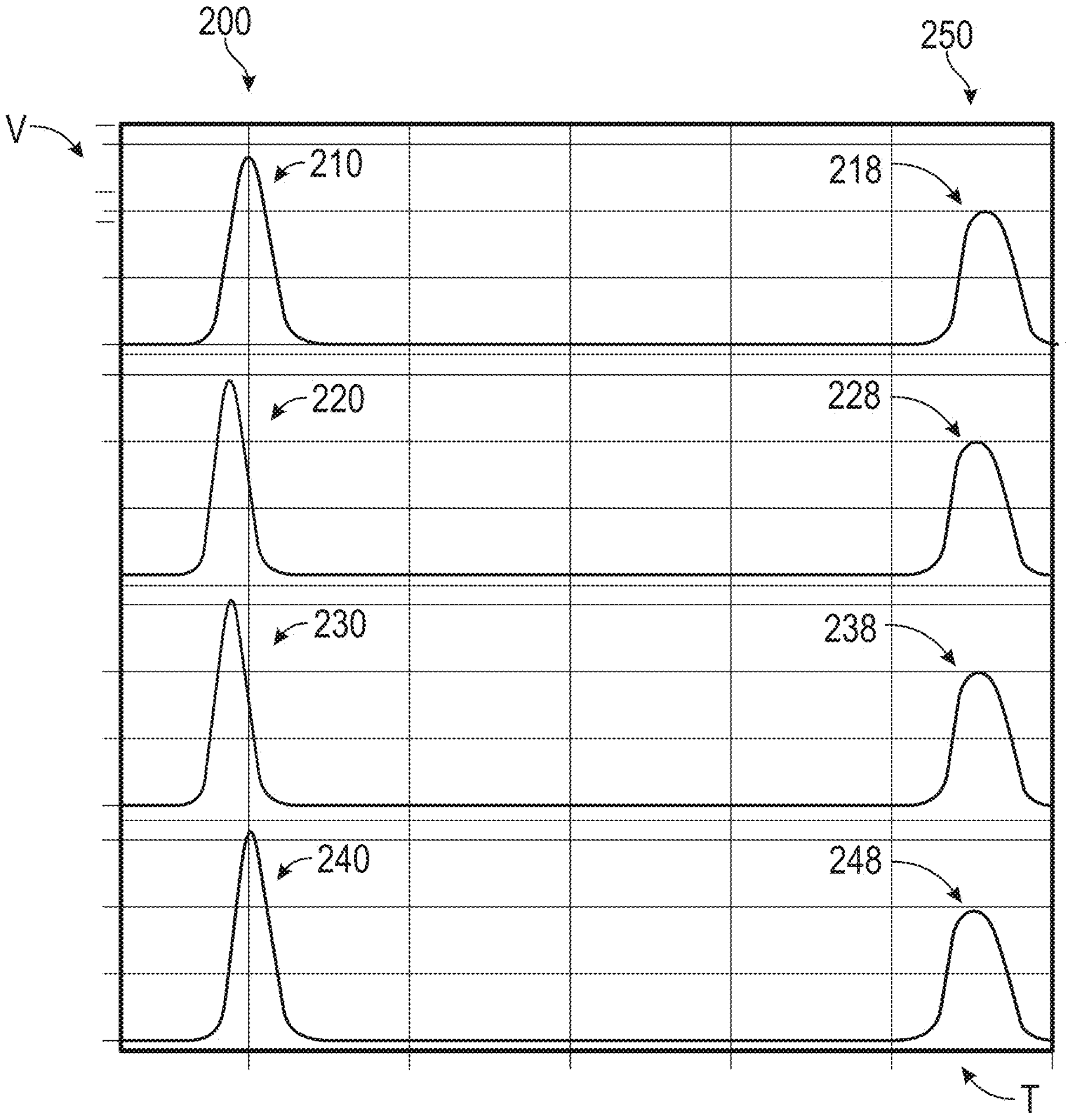
FIG. 4 illustrates measured histograms of signals transmitted by a superconducting detector after being processed by a gating unit.

The measured histograms of signals transmitted by the superconducting detector 112 after being processed by the gating unit 120 are shown in FIG. 4.

The gating unit 120 is adapted to filter out the signals received by the controller C within a threshold time after the initial signals 210, 220, 230, 240 (indicating a real event). FIG. 4 shows the filtered signal with signals 210, 218, 220, 228 from the first set of real events 200 and signals 230, 238, 240, 248 from the second set of real events 250. The filtering is performed for a predetermined time window and repeated for multiple cycles.

The threshold time may be selected to be greater than an error in measuring a time of the respective signal indicating the real event or tuned to maximize acceptance of the real events and maximize rejection of spurious events. One example of tuning the threshold time to maximize signal to noise ratio is as follows: if the threshold time is set to 400 picosecond, there are negligible spurious counts leaking through, but if the threshold is set to 550 picoseconds there is an appreciable increase in spurious counts.

The system 110 is configured such that the separation in time (Δt) between the respective signal (e.g., signal 210) indicating a real event and the respective signal (e.g., signal 212) indicating a false trigger is long enough to be well-separated from the measuring error or error in measuring the time of the real event.

In some embodiments, the threshold time is based on a predefined time delay (Δt) between the respective signals indicating the real event and a false trigger. In one example, the threshold time is approximately half of the predefined time (Δt/2). The system 110 is configured such that the predefined time delay (Δt) is less than the dead time of the nanowire sensors.

In some embodiments, the above implementations may be combined where the gating function is performed directly in a device such that the electrical output pulses from the superconducting detector 12, 112 is fed back into a local switch (e.g., superconducting line that goes normal to block the signal or transistor near the detector) that would automatically disable the pulse output from each of the delay-triggered elements. This feedback mechanism may be electrical or thermal.

In some embodiments, the controller C may include a field-programmable gate array or integrated circuit having an array of programmable logic blocks and interconnection that are configurable to perform various digital functions. The detection systems 10, 110 may employ other time-tagging systems with resolution higher than the pulse separation to separate real signals from spurious pulses.

The superconducting detector 12, 112 is designed to ensure electrical and thermal time constants and noise are engineered to allow sufficient time separation between real and spurious pulses. This time separation enables filtering of the photon events. Pulse timing from the superconducting detector 12, 112 is matched to ensure the speed-of-light time delays from mismatched paths do not prevent proper pulse time separation. With the superconducting devices engineered properly, the electrical noise is sufficiently low to enable excellent separation between real and spurious output signals and the spurious signals may be rejected.

There is a tradeoff between the performance efficiency of the superconducting detector 12 and crosstalk. The nanowire sensors 14 may be spaced close together for improved efficiency, however, this increases the spurious signals. If the nanowire sensors 14 are spaced widely then crosstalk is reduced, however efficiency is also reduced. Reducing the fill factor may reduce crosstalk but also reduces the efficiency of the sensor. Each sensor defines a fill factor, which is the ratio of photosensitive area in the sensor relative to the total sensor area. Having a conventional fill factor in an interleaved configuration causes each of the nanowire sensors 14 to trigger when any single one of them absorbs a photon.

In some embodiments, the crosstalk rejection sequence is implemented when the nanowire sensors 14 operate at a relatively high fill factor. As understood by those by those skilled in the art, in a detector system, a higher fill factor indicates that a large proportion of the total pixel area is actively detecting radiation, meaning the light-sensitive area within each pixel takes up a significant portion of the pixel's total space, resulting in better signal collection. In a non-limiting example, the relatively high fill factor may be at least 40%. In a non-limiting example, the relatively high fill factor may be between about 40 to 50%.

Multi-element superconducting nanowire single-photon detectors suffer from thermal crosstalk when packed too close together. This has up to now seen as a deal breaker/undesirable, so the general solution has been to decrease the fill factor to reduce thermal coupling to negligible levels. In contrast, the systems described herein embrace the coupling, even enhance it by increasing the fill factor to increase efficiency which is key for photon number resolving measurements. By processing the system output, the crosstalk is removed so the user never sees it and the measurement stays pure. The systems described herein provide the inventive step of documenting the deterministic time separation of the crosstalk and implementing a mechanism to remove it.

The signal pattern of the spurious event may be distinguishable from the genuine photon event, with each spurious event having an identifiable time signature that is indicative of its origin (or type of crosstalk). The identifiable time signature may have a specific frequency and may last for a specific duration. In some embodiments, the controller C is adapted to determine an identifiable time signature of the respective signals, with the identifiable time signature being matched to a crosstalk category. The controller C is adapted to identify the crosstalk category of the respective signals in the specified rejection window based in part on the identifiable time signature of the respective signals.

In some embodiments, the controller C may be adapted to obtain respective time-of-arrival data for spurious events arriving in the specified rejection window. The time-of-arrival for spurious events provides positioning information indicating the spatial location of the real event. The controller C determines the spatial location of the real event based on the positioning information from the respective time-of-arrival data.

It is understood that the detection system 10 is not limited to photons. The superconducting detector 12 may be sensitive to other energetic events, including but not limited to, particle absorption, substrate binders etc. In one embodiment, the superconducting detector 12 is connected to a photonic waveguide. Photonic waveguides are structures that use total internal reflection to guide electromagnetic radiation through a core material (with a higher refractive index) surrounded by a cladding material (with a lower refractive index). The controller C is adapted to reject the respective signals in the specified rejection window when the crosstalk category includes thermal scattering, electrical scattering, and pump scattering. Pump scattering occurs when a pump photon is scattered by a molecule, causing the molecule to emit a photon at a different frequency.

Figure 5:
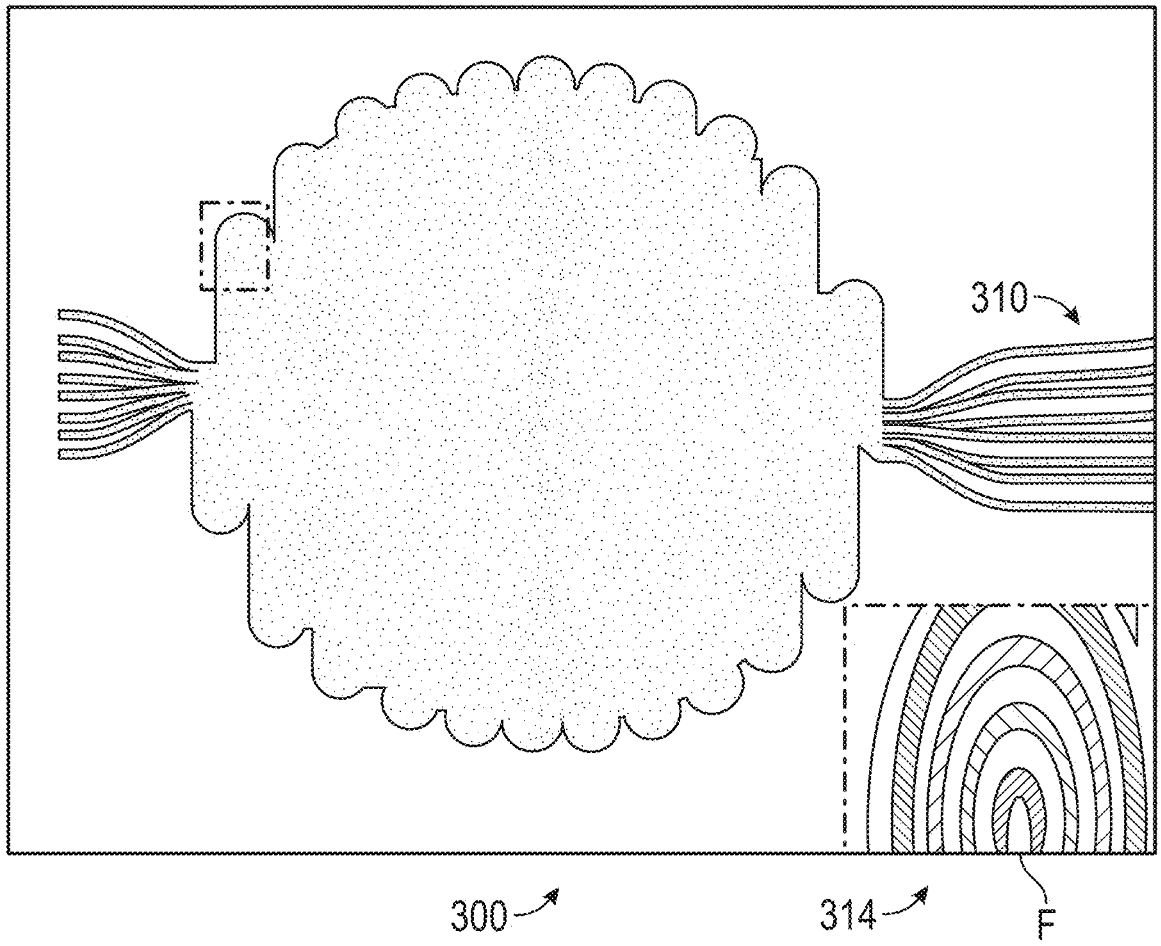
FIG. 5 is an example micrograph of the superconducting detector having a plurality of nanowire sensors arranged in an interleaved configuration.

FIG. 5 is an example micrograph of the plurality of nanowire sensors 314 arranged in an interleaved configuration 300. As shown in the inset, the nanowire sensors 314 are interleaved or woven around a focal point F. The nanowire sensors 314 may be operatively connected to fiber optic couplers 310. The system 10 provides the technical advantage of having multiple nanowire sensors in close proximity which maximizes their efficiency, while mitigating the effect of crosstalk that reduces its efficiency.

Figure 6:
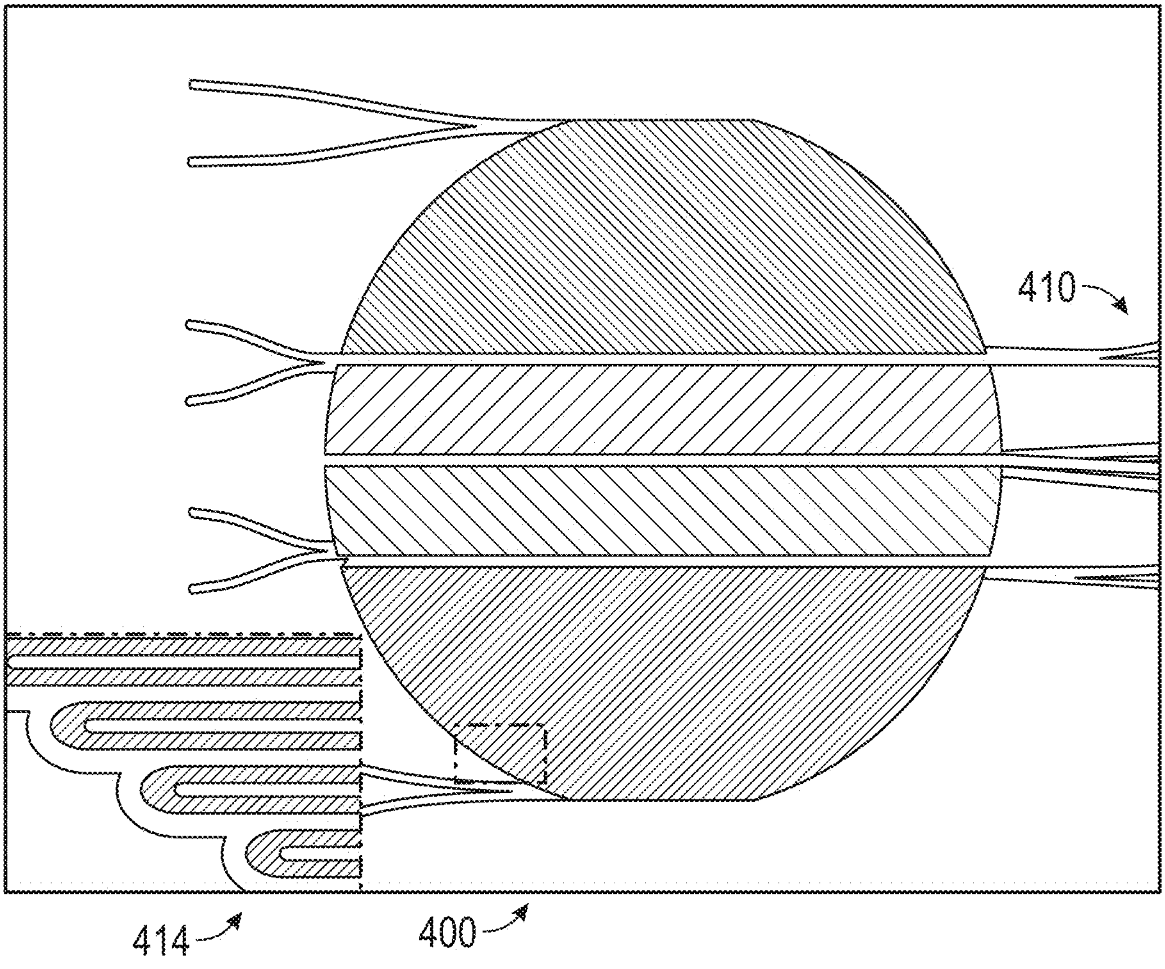
FIG. 6 is an example micrograph of the superconducting detector having a plurality of nanowire sensors arranged in a non-interleaved configuration.

FIG. 6 is an example micrograph of the plurality of nanowire sensors 414 arranged in a non-interleaved configuration 400. As shown in the inset, the nanowire sensors 414 are individually looped and not interleaved around one another. The nanowire sensors 414 may be operatively connected to fiber optic couplers 410.

In summary, the detection systems 10, 110 enable a high-speed, high-efficiency, single-photon detection system using superconducting nanowire technology. The systems 10, 110 minimize high crosstalk between closely spaced nanowire sensors based in part on time delay gating. The time delay is between a direct photon absorption ("real") event and spurious event. Time delay gating is used to eliminate the spurious events, decreasing the net spurious event rate to be less than about 0.01% of the real event rate, while allowing the spurious event probability to be 100%. By allowing the spurious event probability to be high, other significant detector performance metrics such as device detection efficiency remain uncompromised.

The following Clauses provide example configurations of a detection system, and a method for controlling operation of a detection system disclosed herein.

Clause 1: A detection system comprising: a superconducting detector having a plurality of nanowire sensors configured to operate simultaneously, the plurality of nanowire sensors being adapted to transmit respective signals upon detection of one or more photons; a controller adapted to receive the respective signals transmitted by the plurality of nanowire sensors, the controller having a processor and tangible, non-transitory memory on which instructions are recorded; a gating unit in communication with the controller; wherein the controller is adapted to designate an initial signal as indicating a real event, the initial signal being above a predefined amplitude; wherein the controller is adapted to implement a crosstalk rejection sequence, including accepting the respective signals received within a threshold time after the real event during an acceptance window, via the gating unit, and rejecting the respective signals after the threshold time for a specified rejection window; and wherein the crosstalk rejection sequence is repeated for subsequent designations of real events to achieve a desired rate of event rejection.

Clause 2: The system of Clause 1, wherein the plurality of nanowire sensors each have a respective dead time, the controller being adapted to set the threshold time to be less than a shortest one of the respective dead time.

Clause 3: The system of any of Clauses 1-2, wherein the threshold time is selected to maximize acceptance of the real events and maximize rejection of spurious events.

Clause 4: The system of any of Clauses 1-3, wherein the crosstalk rejection sequence is implemented when the plurality of nanowire sensors operate at a relatively high fill factor.

Clause 5: The system of any of Clauses 1-4, wherein the acceptance window and the specified rejection window are implemented directly in real time.

Clause 6: The system of any of Clauses 1-5, wherein the acceptance window and the specified rejection window are implemented during post-processing of the respective signals.

Clause 7: The system of any of Clauses 1-6, wherein the plurality of nanowire sensors each have respective dead times within about 10% of each other, the controller being adapted to set the threshold time to be less than an average value of the respective dead time.

Clause 8: The system of any of Clauses 1-7, wherein the gating unit includes at least one transistor for selectively blocking the respective signals from the plurality of nanowire sensors.

Clause 9: The system of any of Clauses 1-8, wherein the controller is adapted to: obtain respective time-of-arrival data for spurious events arriving in the specified rejection window; and determine positioning information indicating a spatial location of the real event based in part on the respective time-of-arrival data.

Clause 10: The system any of Clauses 1-9, wherein the controller is adapted to: determine an identifiable time signature of the respective signals, the identifiable time signature being matched to a crosstalk category; and identify the crosstalk category of the respective signals in the specified rejection window based in part on the identifiable time signature of the respective signals.

Clause 11: The system of any of Clauses 1-10, wherein: the superconducting detector is operatively connected to a photonic waveguide; and the controller is adapted to reject the respective signals in the specified rejection window when the crosstalk category includes thermal scattering, electrical scattering, and pump scattering.

Clause 12: The system of any of Clauses 1-11, wherein the threshold time is selected to be greater than an error in measuring a time of the respective signals indicating the real event.

Clause 13: The system of any of Clauses 1-12, wherein the gating unit includes a plurality of switches adapted to selectively block the respective signals from the plurality of nanowire sensors, the gating unit being a programmable module selectively executable by the controller.

Clause 14: The system of any of Clauses 1-13, wherein the plurality of nanowire sensors are arranged in an interleaved configuration.

Clause 15: The system of any of Clauses 1-13, wherein the plurality of nanowire sensors are arranged in a non-interleaved configuration.

Clause 16: A method for controlling operation of a detection system having a superconducting detector with a plurality of nanowire sensors configured to operate simultaneously, and a controller having a processor and tangible, non-transitory memory on which instructions are recorded, the method comprising: transmitting respective signals upon detection of at least a single photon, via the plurality of nanowire sensors; receiving the respective signals transmitted by the plurality of nanowire sensors, via the controller; designating an initial signal as indicating a real event, the initial signal being above a predefined amplitude, via the controller; implementing a crosstalk rejection sequence, including accepting the respective signals received within a threshold time after the real event during an acceptance window, via a gating unit, and rejecting the respective signals after the threshold time for a specified rejection window; and repeating the crosstalk rejection sequence for subsequent designations of real events to achieve a desired rate of event rejection.

Clause 17: The method of Clause 16, wherein the plurality of nanowire sensors each have a respective dead time, the method further comprising: setting the threshold time to be less than a shortest one of the respective dead time.

Clause 18: The method of any of Clauses 16-17, further comprising: determining an identifiable time signature of the respective signals, the identifiable time signature being matched to a crosstalk category, via the controller; and identifying the crosstalk category of the respective signals in the specified rejection window based in part on the identifiable time signature of the respective signals.

Clause 19: The method of any of Clauses 16-18, further comprising: rejecting the respective signals in the specified rejection window when the crosstalk category includes thermal scattering, electrical scattering, and pump scattering, the superconducting detector being embedded in a photonic waveguide.

Clause 20: The method of any of Clauses 16-18, further comprising: selecting the plurality of nanowire sensors to have respective dead times within about 10% of each other, and setting the threshold time to be less than an average value of the respective dead time.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" may be used in place of "comprising" and "including" to provide more specific embodiments and are also disclosed. As used in this disclosure and in the appended claims, the singular forms "a", "an", "the", include plural referents unless the context clearly dictates otherwise.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of orders (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such orders. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A detection system comprising:

a superconducting detector having a plurality of nanowire sensors configured to operate simultaneously, the plurality of nanowire sensors being adapted to transmit respective signals upon detection of one or more photons;

a controller adapted to receive the respective signals transmitted by the plurality of nanowire sensors, the controller having a processor and tangible, non-transitory memory on which instructions are recorded;

a gating unit in communication with the controller;

wherein the controller is adapted to designate an initial signal as indicating a real event, the initial signal being above a predefined amplitude;

wherein the controller is adapted to implement a crosstalk rejection sequence, including accepting the respective signals received within a threshold time after the real event during an acceptance window, via the gating unit, and rejecting the respective signals after the threshold time for a specified rejection window; and wherein the crosstalk rejection sequence is repeated for subsequent designations of real events to achieve a desired rate of event rejection.

2. The system of claim 1, wherein the plurality of nanowire sensors each have a respective dead time, the controller being adapted to set the threshold time to be less than a shortest one of the respective dead time.

3. The system of claim 1, wherein the threshold time is selected to maximize acceptance of the real events and maximize rejection of spurious events.

4. The system of claim 1, wherein the crosstalk rejection sequence is implemented when the plurality of nanowire sensors operate at a relatively high fill factor.

5. The system of claim 1, wherein the acceptance window and the specified rejection window are implemented directly in real time.

6. The system of claim 1, wherein the acceptance window and the specified rejection window are implemented during post-processing of the respective signals.

7. The system of claim 1, wherein the plurality of nanowire sensors each have respective dead times within about 10% of each other, the controller being adapted to set the threshold time to be less than an average value of the respective dead time.

8. The system of claim 1, wherein the gating unit includes at least one transistor for selectively blocking the respective signals from the plurality of nanowire sensors.

9. The system of claim 1, wherein the controller is adapted to:

obtain respective time-of-arrival data for spurious events arriving in the specified rejection window; and determine positioning information indicating a spatial location of the real event based in part on the respective time-of-arrival data.

10. The system of claim 1, wherein the controller is adapted to:

determine an identifiable time signature of the respective signals, the identifiable time signature being matched to a crosstalk category; and identify the crosstalk category of the respective signals in the specified rejection window based in part on the identifiable time signature of the respective signals.

11. The system of claim 10, wherein:

the superconducting detector is operatively connected to a photonic waveguide; and the controller is adapted to reject the respective signals in the specified rejection window when the crosstalk category includes thermal scattering, electrical scattering, and pump scattering.

12. The system of claim 1, wherein the threshold time is selected to be greater than an error in measuring a time of the respective signals indicating the real event.

13. The system of claim 1, wherein the gating unit includes a plurality of switches adapted to selectively block the respective signals from the plurality of nanowire sensors, the gating unit being a programmable module selectively executable by the controller.

14. The system of claim 1, wherein the plurality of nanowire sensors are arranged in an interleaved configuration.

15. The system of claim 1, wherein the plurality of nanowire sensors are arranged in a non-interleaved configuration.

16. A method for controlling operation of a detection system having a superconducting detector with a plurality of nanowire sensors configured to operate simultaneously, and a controller having a processor and tangible, non-transitory memory on which instructions are recorded, the method comprising:

transmitting respective signals upon detection of at least a single photon, via the plurality of nanowire sensors;

receiving the respective signals transmitted by the plurality of nanowire sensors, via the controller;

designating an initial signal as indicating a real event, the initial signal being above a predefined amplitude, via the controller;

implementing a crosstalk rejection sequence, including accepting the respective signals received within a threshold time after the real event during an acceptance window, via a gating unit, and rejecting the respective signals after the threshold time for a specified rejection window; and repeating the crosstalk rejection sequence for subsequent designations of real events to achieve a desired rate of event rejection.

17. The method of claim 16, wherein the plurality of nanowire sensors each have a respective dead time, the method further comprising:

setting the threshold time to be less than a shortest one of the respective dead time.

18. The method of claim 17, further comprising:

determining an identifiable time signature of the respective signals, the identifiable time signature being matched to a crosstalk category, via the controller; and identifying the crosstalk category of the respective signals in the specified rejection window based in part on the identifiable time signature of the respective signals.

19. The method of claim 18, further comprising:

rejecting the respective signals in the specified rejection window when the crosstalk category includes thermal scattering, electrical scattering, and pump scattering, the superconducting detector being embedded in a photonic waveguide.

20. A detection system comprising:

a superconducting detector having a plurality of nanowire sensors configured to operate simultaneously, the plurality of nanowire sensors being adapted to transmit respective signals upon detection of at least a single photon;

a controller adapted to receive the respective signals transmitted by the plurality of nanowire sensors and designate an initial signal as indicating a real event, the controller having a processor and tangible, non-transitory memory on which instructions are recorded;

a gating unit in communication with the controller, the initial signal being above a predefined amplitude;

wherein the controller is adapted to implement a crosstalk rejection sequence, including accepting the respective signals received within a threshold time after the real event during an acceptance window, via the gating unit, and rejecting the respective signals after the threshold time for a specified rejection window;

wherein the crosstalk rejection sequence is repeated for subsequent designations of real events to achieve a desired rate of event rejection;

wherein the crosstalk rejection sequence is implemented when the plurality of nanowire sensors operate at a relatively high fill factor; and wherein the plurality of nanowire sensors each have a respective dead time, the controller being adapted to set the threshold time to be less than a shortest one of the respective dead time.

* * * * *